United States Patent Office 3,117,986
Patented Jan. 14, 1964

3,117,986
PROCESS FOR PREPARATION OF O,O-DIMETHYL-DITHIOPHOSPHORYL-ACETIC ACID MONO-METHYLAMIDE
Richard Sehring and Karl Zeile, Ingelheim, Germany, assignors to C. H. Boehringer Sohn, Ingelheim (Rhine), Germany, a limited partnership of Germany
No Drawing. Filed July 2, 1962, Ser. No. 207,043
Claims priority, application Germany July 3, 1961
6 Claims. (Cl. 260—461)

This invention relates to a novel method of preparing the known insecticidal compound O,O-dimethyl-dithiophosphoryl-acetic acid monomethylamide of the formula

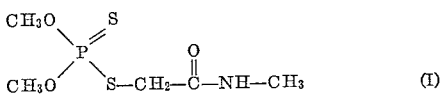

(I)

By virtue of its high effectiveness as a contact insecticide as well as its systemic action coupled with low toxicity to warm-blooded animals, this compound has acquired great importance as an active ingredient in insect control compositions.

It is known that O,O-dimethyl-dithiophosphoryl-acetic acid monomethylamide may be prepared by reacting a corresponding alkyl ester, that is, an alkyl ester of O,O-dimethyl-dithiophosphoryl-acetic acid of the formula

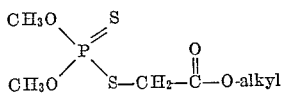

with methylamine. According to the prior art literature, however, only the methyl ester has been used for this purpose on an industrial scale. The utility of higher alkyl esters, such as the propyl and butyl esters, was also investigated, but it was found that they produced substantially poorer yields of the desired end product (13.6 and 25.6% of theory, respectively) than the methyl ester under the indicated reaction conditions. Consequently, the higher alkyl esters are not suitable for use as starting materials in this reaction on an economical industrial scale.

The known reaction of the alkyl ester of O,O-dimethyl-dithiophosphoryl-acetic acid with methylamine takes place heterogeneously in aqueous solution; that is, the reaction occurs at the interface between the water-insoluble ester and the aqueous methylamine solution. In order to cause the reaction to proceed smoothly and without undesirable side-reactions, it is necessary to stir the reaction mixture very vigorously. However, even if the reaction mixture is intensively and vigorously agitated, the course of the reaction is difficult to control; the yields vary widely, especially if large quantities of the starting materials are used.

To remedy these defects, it has also been proposed to perform the reaction in homogeneous fashion, namely, in methanol rather than water. However, this suggested improvement has not made it possible to raise the yields of O,O-dimethyl-dithiophosphoryl-acetic acid monomethylamide above 65.5% of theory.

It is an object of the present invention to provide a process for the preparation of O,O-dimethyl-dithiophosphoryl-acetic acid monomethylamide which is free from yield-reducing side reactions.

It is a further object of the present invention to provide a process for the preparation of O,O-dimethyl-dithiophosphoryl-acetic acid monomethylamide which may be carried out economically on an industrial scale and produces consistently high yields of the desired end product.

Other objects and advantages of the present invention will become apparent as the description thereof proceeds.

We have discovered that the above objects and advantages are achieved by reacting methylamine with the bis-(O,O-dimethyl-dithiophosphoryl-acetic acid) ester of ethylene glycol of the formula

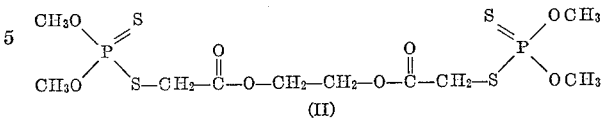

(II)

The novel reaction according to the present invention yields the desired O,O-dimethyl-dithiophosphoryl-acetic acid monomethylamide (I) in amounts of 83 to 95% of theory and in a very pure state, even when large quantities of the reactants are used. The reactants are advantageously provided in a molar ratio of about 2:1, that is, about 2 mols of methylamine for each mol of the ethylene glycol diester, the methylamine reactant being in the form of an aqueous solution. Especially advantageous, however, is the performance of the reaction in a single-phase, homogeneous system, which is achieved by presenting the methylamine reactant in solution in a lower alkanol or in an aqueous lower alkanol. For example, an especially favorable embodiment of the process according to the present invention comprises mixing equal parts by volume of methanol and an aqueous 30% solution of technical grade methylamine, and adding the resulting mixture to the diester (II) while maintaining the reaction mixture at a temperature of about 0° C. The diester goes into solution. Temperatures of more than 30° C. should be avoided during the reaction because yield-reducing side reactions increase sharply above that temperature.

The reaction product (I) may be separated from the reaction mixture in very simple fashion, for example by adding water to the reaction mixture, whereby the water-insoluble reaction product (I) precipitates out. It may then be isolated by simple filtration and purified by recrystallization from a suitable solvent, such as heptane, or benzine.

The bis-(O,O-dimethyl-dithiophosphoryl-acetic acid)-ester of ethylene glycol, which is used as one of the starting materials in the process of the present invention, may be prepared by various methods. For instance, it may be obtained by reacting an aqueous solution of S-sodium-O,O-dimethyl-dithiophosphate with the bis-(chloroacetic acid)-ester of ethylene glycol, or by esterification of O,O-dimethyl-dithiophosphoryl-acetic acid with ethylene glycol in a molar ratio of about 2:1 in toluene and in the presence of an esterification catalyst, such as p-toluene-sulfonic acid. Either of these methods yields the ethylene glycol diester (II) in amounts of more than 90% of theory.

The following examples shall further illustrate the present invention and enable others skilled in the art to understand it more completely. It should be understood, however, that our invention is not strictly limited to the specific conditions described in these illustrative examples.

*Example I*

115 gm. (.25 mol) of the bis-(O,O-dimethyl-dithiophosphoryl-acetic acid)-ester of ethylene glycol were placed into a round-bottom flask provided with a stirrer, and then a solution of 18 gm. (.58 mol) of monomethylamine in 100 cc. of methanol at 0° C. was added dropwise to the contents of the flask while stirring the same. During the addition of the methylamine solution the temperature of the contents of the flask was maintained at 0° C. After all of the methylamine had been added the reaction mixture was stirred at 0° C. for 3½ hours more. The stirrer was then stopped and 175 cc. of water were added to the flask. A precipitate formed, which was filtered off and was taken up in methylene chloride. The methylene chloride solution was evaporated to dryness, leaving 101 gm. of a crystalline residue having a melting point of 48° C. The residue was identified to be 95% pure O,O-dimethyl-dithiophosphoryl-acetic acid monomethylamide. Based on the amount of pure product in the raw crystalline residue, this represented a yield of 83.4% of theory. The raw product was purified by repeated recrystallization from heptane, whereupon it had a melting point of 51° C.

*Example II*

229 gm. (0.5 mol) of the bis-(O,O-dimethyl-dithiophosphoryl-acetic acid)-ester of ethylene glycol were placed into a round-bottom flask provided with a stirrer. Thereafter, a mixture of 120 cc. of an aqueous 31% solution of monomethylamine solution (1.1 mol) and 120 cc. of methanol at 0° C. was added dropwise to the contents of the flask, accompanied by stirring. During the addition of the aqueous methanolic methylamine solution the contents of the flask were maintained at a temperature between 0 and +5° C. by exterior cooling. After all of the methylamine solution had been added, the reaction mixture was stirred at 0 to 5° C. for an additional two hours, at which time the reaction had gone to completion. Despite the presence of water, the reaction proceeded in homogeneous phase under these conditions. 300 cc. of water were then added to the reaction mixture, whereby a precipitate formed. The precipitate was taken up in methyl isobutyl ketone. This solution was then evaporated to dryness. The residue was a colorless crystalline mass weighing 220 gm., which was identified to be 98% pure O,O-dimethyl-dithiophosphoryl-acetic acid monomethylamide. Calculated on the basis of pure reaction product, the yield of monomethylamide was 94% of theory.

When the above run was repeated on a kilogram scale the same yield was obtained.

*Example III*

229 gm. (0.5 mol) of the bis-(O,O-dimethyl-dithiophosphoryl-acetic acid)-ester of ethylene glycol were placed into a round-bottom flask provided with a stirrer. Thereafter, 120 cc. of an aqueous 31% solution of methylamine (1.1 mol) at 0° C. were added dropwise to the contents of the flask, accompanied by stirring. During the addition of the methylamine solution the temperature of the contents of the flask was maintained between 0 and +5° C. After all of the methylamine solution had been added, the reaction mixture was stirred at 0 to +5° C. for another 3½ hours, at which time the reaction had gone to completion. A precipitate had formed which was taken up in methylenechloride. The resulting solution was evaporated to dryness. The evaporation residue was a crystalline mass weighing 210 gm., which was identified to be 92% pure O,O-dimethyl-dithiophosphoryl-acetic acid monomethylamide. Calculated on the basis of pure reaction product, the yield was 84.5% of theory.

When the above run was repeated on an industrial scale with kilogram-size amounts of the starting materials, yields of 75 to 80% of theory of pure O,O-dimethyl-dithiophosphoryl-acetic acid monomethylamide were obtained.

The advantages of the process according to the present invention become especially conspicuous when it is carried out on an industrial scale. In contrast to the heterogeneous operating conditions of the prior art, the process of the present invention insures uniform, homogeneous admixture of the reactants at all times without the aid of special apparatus, such as high-speed stirrers and the like. Moreover, the novel process described herein is not subject to yield reduction due to undesired side reactions or incomplete reaction; instead, the yield of pure O,O-dimethyl-dithiophosphoryl-acetic acid monomethylamide is constantly within the range of 83 to 95% of theory. Another important advantage of the process acoording to the present invention is that the reaction period is reduced to such an extent that for any given capacity about double the amount of throughput can be achieved as against the prior art methods.

While we have illustrated our invention with the aid of certain specific embodiments, it will be readily apparent to others skilled in the art that the invention is not limited to these specific embodiments and that various changes and modifications may be made without departing from the spirit of the invention or the scope of the appended claims.

We claim:

1. The method of preparing O,O-dimethyl-dithiophosphoryl-acetic acid monomethylamide which comprises reacting methylamine with the bis-(O,O-dimethyl-dithiophosphoryl-acetic acid)-ester of ethylene glycol at a temperature below 30° C.

2. The method of preparing O,O-dimethyl-dithiophosphoryl-acetic acid monomethylamide which comprises reacting methylamine with the bis-(O,O-dimethyl-dithiophosphoryl-acetic acid)-ester of ethylene glycol at a temperature between 0 and 30° C.

3. The method of preparing O,O-dimethyl-dithiophosphoryl-acetic acid monomethylamide which comprises reacting an aqueous solution of methylamine with the bis-(O,O-dimethyl-dithiophosphoryl-acetic acid)-ester of ethylene glycol at a temperature between 0 and 30° C.

4. The method of preparing O,O-dimethyl-dithiophosphoryl-acetic acid monomethylamide which comprises reacting an aqueous methanolic solution of methylamine with the bis-(O,O-dimethyl-dithiophosphoryl-acetic acid)-ester of ethylene glycol at a temperature between 0 and 30° C.

5. The method of preparing O,O-dimethyl-dithiophosphoryl-acetic acid monomethylamide which comprises reacting a methanolic solution of methylamine with the bis-(O,O-dimethyl-dithiophosphoryl-acetic acid)-ester of ethylene glycol at a temperature between 0 and 30° C.

6. The method of preparing O,O-dimethyl-dithiophosphoryl-acetic acid monomethylamide which comprises reacting methylamine with the bis-(O,O-dimethyl-dithiophosphoryl-acetic acid)-ester of ethylene glycol at a temperature between 0 and 30° C., the ratio of methylamine to ethylene glycol diester being about 2:1.

References Cited in the file of this patent

UNITED STATES PATENTS 3,032,579    Losco et al. _____ May 1, 1962